May 12, 1936.  W. W. HAASE  2,040,128
BURIAL VAULT
Filed Feb. 7, 1934
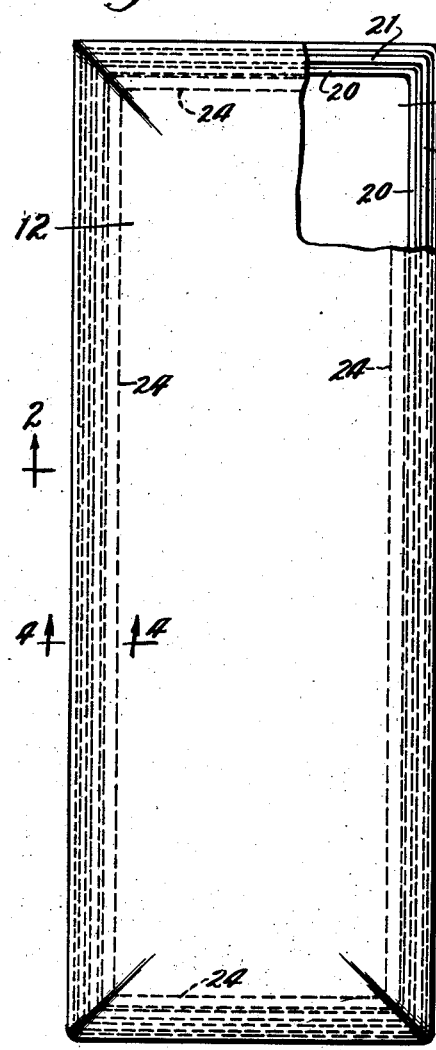
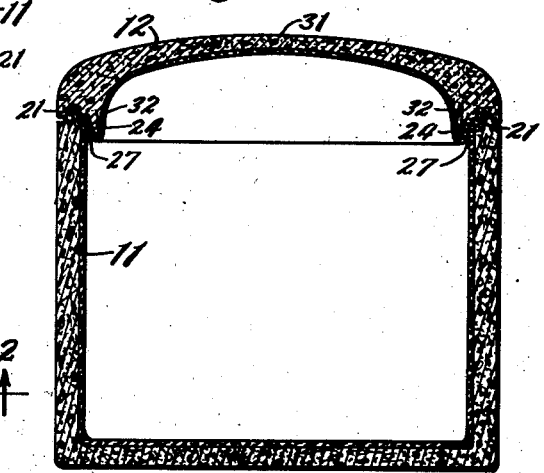
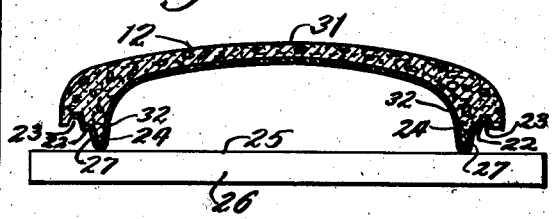
Inventor.
Wilbert W. Haase
By Raymond W. Schnoor
Atty Patented May 12, 1936

2,040,128

UNITED STATES PATENT OFFICE 2,040,128

BURIAL VAULT

Wilbert W. Haase, Forest Park, Ill., assignor to Wilbert W. Haase Co., Forest Park, Ill., a corporation of Illinois Application February 7, 1934, Serial No. 710,139

3 Claims. (Cl. 72—7)

This invention relates to a burial vault and has for an important object the provision of such a device of increased efficiency, strength, and portability.

Other objects such as the improved utility, economy and efficiency of construction and operation will be apparent as the invention is better understood from the following description, which, taken in connection with the accompanying drawing, discloses a preferred embodiment thereof.

Referring to the drawing;

Figure 1 is a plan view of a device embodying my invention.

Fig. 2 is a transverse section taken substantially on line 2—2, Fig. 1.

Fig. 3 is a similar sectional view illustrating a vault cover supported upon a plain surface in accordance with my invention, and;

Fig. 4 is an enlarged detail view taken substantially on line 4—4, Fig. 1, and showing the vault parts slightly separated.

To illustrate the invention I have shown a vault of the type shown and described in my earlier Letters Patent of the United States, Number 1,839,149, issued December 29, 1931, for Burial vault, and including a base part 11, and a cover part 12.

While the vault parts 11 and 12 shown are laminated or double walled structures, it will be noted that the composition or the laminated structure of the parts forms no part of the present invention.

In practice burial valuts include a base part, similar in many details to the base part 11, and a cover part, likewise similar to the cover part 12, and these parts are separable and provided with suitable abutting edge or junctional formations whereby a sealed joint is formed upon assembly for sealing the vault to preserve the contents thereof. Such a joint is formed in the vault illustrated by a surface or edge portion 20 and a tongue 21 formed at the margin or upper edge of the base part 11, and to engage a surface or edge portion 22 and a corresponding groove or recess 23 in the cover part 12, which edge portion and tongue and groove form an interlocking and sealed joint upon assembly.

In devices of this character it is important that the abutting edges forming the sealed joint be protected in transportation and when the parts are separated, particularly this portion of the cover part, and to accomplish this a suitable support means is extended from the cover 12, such as a support device 24, for supporting the cover so that the abutting edge portion thereof can not come in contact with a supporting surface, such as the surface 25 of a plate 26 illustrated (Fig. 3).

In the present embodiment the support device 24 is continuous or extended to form a continuous web and a surface 27 of the web or support 24 serves to register or locate the cover as an incident to assembly and so that the tongue 21 or other portions of the abutting surfaces will not be damaged as an incident to assembly.

In many instances this type of burial vault is buried in the ground and covered with a considerable depth of earth which is of relatively great weight and which must be supported by the cover part of the vault. To provide a relatively light weight vault capable of withstanding the pressure due to such a load of materials or earth, I have shown the cover 12 of a slab-like type and in part molded of concrete to the cross-sectional form of an arch or so that the thickness of the rigid material of the cover, such as the concrete, is at any point proportional to the distance of that point from the nearest supporting surface.

In Figs. 2 and 3, a point 31, which is substantially centrally located and is located at the greatest distance from the supporting surfaces or abutting edges 22, is relatively thin and the thickness of the cover increases toward the nearest support or in both directions from the point 31 and in accordance with the distribution of stresses in the cover under load.

In the present embodiment a surface 32 of the support element 24 or supporting web forms a continuation of the inner surface of the cover 12.

It is thought that the invention and many of its attendant advantages will be understood from the foregoing description, and it will be apparent that various changes may be made in the form, construction, and arrangement of the parts without departing from the spirit and scope of the invention, or sacrificing all of its material advantages, the form hereinbefore described being merely a preferred embodiment thereof.

I claim:

1. A burial vault comprising, a base member and a cover member therefor, said members having edge portions arranged to register upon assembly and to form a sealed joint, the cover member including a concrete portion of slab-like form extending between and terminating at the edge portions of the cover, the thickness of said slab-like portion being varied inversely proportional to the increase in distance from the nearest edge portion, and an extended tapered guide element integral with said cover member whereby the base and cover members are registered as an incident to assembly.

2. A burial vault comprising, a base member, and a cover member therefor, said members having edge portions arranged to register upon assembly, the cover member including a concrete portion of slab-like form extending between and terminating adjacent the edge portions thereof, the thickness of said slab-like portion being varied in accordance with the distribution of stresses thereon in use, and marginally disposed integral support means on said cover and extending beyond the edge portion thereof whereby the cover is guided into register with the base as an incident to assembly and whereby the cover may be supported independently.

3. A burial vault comprising, a base member and a cover member, each having coordinated edge portions, said cover member having integral marginally disposed depending guide means thereon extending beyond the sealing edge portion thereof for supporting said cover member independently and being tapered to facilitate registry of the cover member with the base member as an incident to assembly thereof.

WILBERT W. HAASE.